United States Patent [19]

Davidson

[11] 4,115,187

[45] Sep. 19, 1978

[54] AGGLOMERATED FILLERS USED IN PAPER

[75] Inventor: Richard Robertson Davidson, Cambridge, England

[73] Assignee: Welwyn Hall Research Association, England

[21] Appl. No.: 660,516

[22] Filed: Feb. 23, 1976

Related U.S. Application Data

[63] Continuation-in-part of Ser. No. 379,470, Jul. 16, 1973, abandoned, which is a continuation-in-part of Ser. No. 130,507, Apr. 1, 1971, abandoned.

[51] Int. Cl.$^2$ ............................................. D21H 3/66
[52] U.S. Cl. .............................. 162/168 R; 162/174; 162/175; 162/181 A; 162/183
[58] Field of Search .............. 162/181 A, 175, 168 R, 162/174, 178, 183; 427/215, 220, 221; 106/308 C, 308 N, 308 P, 308 M

[56] References Cited

U.S. PATENT DOCUMENTS

| | | | |
|---|---|---|---|
| 1,622,474 | 3/1927 | Sveen | 162/174 |
| 1,808,072 | 6/1931 | Rafton | 162/174 |
| 2,949,397 | 8/1960 | Werner et al. | 106/308 C |
| 2,952,580 | 9/1960 | Frasch | 162/181 A |
| 3,257,267 | 6/1966 | Hay | 162/159 |
| 3,597,251 | 8/1971 | Kaufman | 162/181 A |
| 3,622,447 | 11/1971 | van der Geer | 162/168 |
| 3,647,492 | 3/1972 | Chapman et al. | 106/308 P |

*Primary Examiner*—S. Leon Bashore
*Assistant Examiner*—William F. Smith
*Attorney, Agent, or Firm*—Mawhinney & Mawhinney & Connors

[57] ABSTRACT

Acid reactive mineral particles are treated by dissolving certain hydrophilic organic polymeric compounds in the interparticulate water of an aqueous dispersion of the mineral particles and adding an interacting chemical to insolubilize the polymeric material and thereby form stable particle plus polymer agglomerates having a decreased rate of attack by acid. The acid protected particle plus polymer agglomerates are formed with a paper furnish into a paper sheet. A particularly preferred mineral is calcium carbonate. Suitable polymeric compounds are starch, sodium alginate, casein and alkali-solubilized latices. Sometimes it may be advantageous to use organic polymeric compounds in combination with one another.

29 Claims, 5 Drawing Figures

AGGLOMERATED FILLERS USED IN PAPER

RELATED APPLICATIONS

This application is a continuation-in-part of my U.S. Pat. application No. 379,470 filed 7/16/73, abandoned which is itself a continuation-in-part of my earlier U.S. Pat. application No. 130,507 4/1/71 (now abandoned).

BACKGROUND OF THE INVENTION

1. Field of the Invention

The present invention relates to the treating of mineral particles with insolubilizable compounds by an improved process to give paper with improved properties. It particularly relates to the use of calcium carbonate. One of the most important technical results of the invention is that there is reduced chemical reactivity of the calcium carbonate in the presence of papermaker's alum. It becomes an economic possibility to manufacture paper filled with calcium carbonate and sized by the traditional rosin-alum sizing process whilst avoiding difficulties which have in the past made such manufacture impracticable.

The present invention provides mineral fillers for the manufacture of sized paper which has an improved resistance to dusting at high filler loadings and improved burst strength and tensile strength over papers made with conventional fillers. In addition there is an increased rate of ink drying.

By use of the fillers of this invention advantages occur in the manufacturing process. The rate of drainage from the wire of the paper machine is improved and therefore the speed of the paper machine can be increased by up to 30% to produce the same quality of paper. Retention of the filler on the paper machine wire is increased and severe frothing, an almost insuperable difficulty heretofore encountered with rosin alum sizing and calcium carbonate filler, is controlled.

The use of calcium carbonate fillers is advantageous as loading or filler in paper because of improved durability. With natural chalk whiting there is a further advantage in economy over the commonly used material china clay. This fundamentally derives from the fact that practically all of the rock from a chalk quarry is converted to filler, whereas from a clay pit a large proportion of impurity, such as silica, is discarded. A further advantage in England of the chalk whitings as fillers, as compared with china clay, lies in the abundant supply and the convenient location of whiting manufacturing works.

2. Discussion of the Prior Art

The development of the use of chalk whiting as a paper filler has been considerably inhibited by difficulties which arise in the use of the traditional rosin soap/papermakers' alum sizing process in the conventional paper making processes. Although alternative sizing processes, such as the use of alkyl ketene dimer ("Aquapel", Trade Name of Hercules Powder Co.), cationic polymer emulsions ("Basoplast", Trade Name of B.A.S.F. (U.K.) Ltd), and solubilized carboxylated polymer ("Scripset", Trade Name of Monsanto Chemicals Ltd.), as sizing agents these each have individual disadvantages, and the large bulk of paper is still made by the traditional, rosin-alum sizing process. This process normally operates under acid conditions which are impossible to maintain in the presence of suspended calcium carbonate particles.

In a paper making process using soft water which is not recirculated (an open backwater system) sizing of cellulose pulp containing a calcium carbonate filler using rosin and papermakers' alum occurs readily producing a paper with physical properties very comparable to a paper made under similar conditions with a clay filler only.

This process is however generally impracticable; some mills run on hard water, most in order to save water use a recirculating system and employ backwater in the primary pulper and in the first make-up water of the machine chest.

It has been shown that under some mill conditions good sizing, when calcium carbonate is used as a filler, can be obtained by the use of alum and a high-free rosin emulsion size such as Bewoid, as marketed by Butler Malros Ltd. In the operation of this process, however, difficulties are experienced especially when a high proportion of the machine water is recirculated. With calcium carbonate as filler the pH is automatically buffered back to about 7.0 regardless of the amount of alum added so that this method can no longer be employed. In any case there is a tendency for papermakers to add an excess of alum to maintain the accustomed pH values. This leads to further difficulties.

During a paper making run there is a build-up of calcium sulphate in the circulating water of the paper machine due to reaction between the acidic alum and the calcium carbonate. This had disadvantages; the presence of sulphate ions is undesirable since sulphate tends to destroy sizing at neutral or slightly acidic pH values. Also the calcium ions are liable to react with the small amount of sodium rosinate which is present in the Bewoid size. The calcium rosinate which is thus formed has little or no sizing property and is hydrophobic and tends to froth to the surface of the web as it is forming on the paper machine stabilising air-bells and giving rise to bubble marks, "dandy marks" or "worm marking".

The literature contains many disclosures of processes which claim success in rosin alum sizing paper in the presence of acid reactive fillers but none of these processes have been industrially successful. On the other hand the present invention shows considerable cost savings because of the successful use of calcium carbonate as a filler.

'Pulp and Paper: Chemistry and Chemical Technology', second edition, J. P. Casey; Interscience 1960, Volume II, p 987, states "Calcium carbonate would be an excellent filler except that it must be under alkaline conditions. Most paper is made at a pH of 4.5 – 5.5 and under these conditions, calcium carbonate reacts with the alum. This produces foam, changes the shade of coloured papers, increases pitch formation, and most serious of all reduces or completely destroys the sizing. Starch, especially potato, helps to control foam".

The above factors have effectively prevented calcium carbonate being used as a paper loading. Varieties of this filler are used as paper coating components, and so some finds its way via the broke back into the paper stock. To maintain the required acid conditions the calcium carbonate must be as far as possible washed out of the broke and/or completely dissolved in acid, so that acid papermaking conditions can be maintained.

The only escape from these difficulties would seem to be to treat the calcium carbonate filler so as to reduce the rate of reaction with acid in order that the required acidic conditions can be maintained on the paper machine wire without excessive use of alum. The present invention involves the treatment of acid reactive mineral particles before employing them in the final stages of the papermaking process. This novel process, when employed with suitable hydrophilic organic polymers confers many beneficial effects, detailed above, on the paper produced.

The process of the present invention for the first time enables calcium carbonate filler to be used with rosin-alum sizing without the above difficulties by reducing the rate of reaction between calcium carbonate and acidic alum, so enabling the pH to be maintained at a sufficiently low and controllable level for successful mill operation.

This process involves the formation of filler plus polymer agglomerates. The precise nature of these is uncertain but their preparation is not disclosed in the prior art.

The prior art details many processes for treatment of pigments and fillers mostly for use in rubbers, plastics and non-aqueous paints but in general such treatment is quite inappropriate for aqueous papermaking systems because of the hydrophobic or organophilic nature of the resulting pigments or fillers.

In papermaking processes these treated pigments and fillers do not wet with water and they accentuate the froth problems mentioned above. In addition they are inappropriate for use with calcium carbonate fillers during paper manufacture because they have little bonding action with cellulose fibres. Mostly they would tend to destroy bonding between hydrophilic filler and hydrophilic fibres and between fibres. To gain advantages in strength, hydrophilic hydroxylated polymers notably gel-forming polysaccharides and polyalcohols, which are not dissimilar in character to the cellulose itself, certain carboxylated polymers, or proteins can be used. Presence of a polymer not of the above type such as an alkali-solubilised acrylic emulsion may be advantageous to help insolubilization or to modify rheology for forming filiform filler polymer agglomerates.

It is customary in the papermaking art to add starch or other polymers of a hydrophilic nature to the paper machine at the beater or elsewhere. These have a fibre-bonding but not specifically a filler bonding action. Only by choosing polymers and polymer mixtures which have a similar hydrophilic nature to the papermaking fibres and forming the filler particle agglomerates which are characteristic of the present invention before individual filler particles can interact with the fibres can the process of the invention be made to succeed.

As stated above the materials inappropriate for papermaking, soaps and hydrophobic resins would, on the paper machine cause pitch and frothing difficulties. Such materials tend to stick to wire, rolls, and felts under the conditions of sizing of clay-loaded paper. One trouble experienced with fatty acid soaps is wire blinding, particularly severe with hard water. As stated by Casey (p. 1097) this becomes worse in the presence of calcium carbonate. Also such alkali-solubilised soaps adsorb onto the calcium carbonate particles, making them hydrophobic. De-wetting and froth-spume difficulties arise. The result is that good paper cannot be made because of foaming.

The prior art also discloses treatment of fillers and pigments with silicates. This does not appear to be effective in the process of the present invention. Silicates are not organic hydrophilic polymers so that this does not constitute prior disclosure. Examples of prior art but not prior disclosure of this invention are:

U.S. Pat. No. 2,259,483 describes the treatment of a pigment with an alkali metal silicate and a water-soluble salt capable of precipitating the silicate in an insoluble form to form a hydrophobic coating.

U.S. Pat. No. 2,296,639 describes the treatment of a pigment with a soluble silicate and precipitation of the silicate with alum.

U.S. Pat. No. 3,025,179 describes the treatment of a pigment with hydrophobic organic compound and alkali metal salts of higher fatty acids, and mono or disubstituted polysiloxanes. The coating is precipitated and the water removed.

U.S. Pat. No. 3,642,510 describes the formation of hydrophobic titanium oxide pigment by adding an alkali metal salt of a carboxyl compound to a slurry of titanium oxide and precipitation of the material.

U.S. Pat. No. 3,348,959 describes the treatment of pigments with hydrophobic coatings formed from alkali and ammonium salts of various carboxylic acids with boron, antimony, arsenic, zinc lead or chromium organic salts.

The processes disclosed in these patents are inappropriate for papermaking because of the hydrophobic nature of the filler produced.

It is also known in the art, U.S. Pat. No. 2,140,394 - Ruff, to coat mineral particles with starch by heating the mineral particles with starch particles so that the starch particles burst surrounding the particles with colloidal starch. However, this process needs a high proportion of starch to filler and the temperature of all the filler and water in which it is suspended to be raised. This requires a large amount of heat if it is to be used successfully in a paper mill, making the process uneconomic and not industrially useful.

It is evident that U.S. Pat. No. 2,140,394 - Ruff does not disclose the addition of a gellant, flocculant or precipitant to the starch. The gelling process is only carried out by the method of cooling. There is little doubt in this matter that the method disclosed by Ruff would be effective; the only difficulty is that it is not economic. It is not until the present invention that an economic process of making paper has been proposed in which calcium carbonate is used as a filler in conjunction with conventional rosin and alum sizing without the associated problems of acid reaction between the alum and calcium carbonate, frothing and many other problems set out above.

U.S. Pat. No. 3,257,267 (Hay) is concerned with the incorporation of certain materials into fibrous materials by embedding the material to be incorporated in a gel matrix prior to addition to the fibres. The production of gels is described and the application of the method to filler particles in papermaking. It is, however, clear that this disclosure is concerned solely with physical or mechanical means and not chemical means to produce "particulate masses". There is no suggestion therein of the formation of stable agglomerates by the use of chemical insolubilization agents. At least one of the gel systems produced by the Hay process would swell in time and break up, such system being polyvinyl alcohol (PVA)/borax. For this reason, and as will be explained hereinafter, the use of PVA/borax to produce stable agglomerates is not possible in the present invention. Data will be presented hereinafter indicating the large differences between the Hay process and the present invention. Suffice it to say at this point that papers produced by the present invention possess desirable permanence properties and have very satisfactory wet web and overall strength properties.

SUMMARY OF THE INVENTION

According to one aspect of the present invention there is provided a method of making paper using an acid reactive mineral filler which permits the use of an acid pH, which method comprises:
 (a) forming an aqueous dispersion containing at least 30%, by weight, of said reactive mineral filler, wherein the interparticulate water of said dispersion has dispersed therein at least one hydrophilic organic polymer selected from the group consisting of polysaccharides, proteinacious compounds, hydroxylated polymers and alkali solubilized latices, said at least one polymer being capable of being rendered water-insoluble by a chemical insolubilization agent;
 (b) treating said dispersion with at least sufficient of said insolubilization agent to form insolubilized polymer and to produce a suspension containing stable agglomerates of filler particles, said particles being held together by said insolubilized polymer to form said agglomerates;
 (c) intimately blending a filler amount of said suspension with a papermaking stock to form a blend having an acid pH; and
 (d) forming a paper from said blend and recovering said paper.

The invention also provides in another aspect a method of making a paper using a calcium carbonate filler, which method comprises:
 (a) forming an aqueous dispersion containing at least 30% by weight, of said calcium carbonate filler, wherein the interparticulate water of said dispersion has dispersed therein at least one hydrophilic organic polymer selected from the group consisting of starch, alginates, casein and alkali-solubilized latices, said at least one polymer being capable of being rendered water-insoluble by a chemical insolubilization agent;
 (b) treating said dispersion with at least sufficient of said chemical insolubilization agent to form insolubilised polymer and to produce a suspension containing stable agglomerates of filler particles, said particles being held together by said insolubilized polymer to form agglomerates;
 (c) intimately blending a filler amount of said suspension with a papermaking stock to form a blend having an acid pH; and
 (d) forming a paper from said blend and recovering said paper.

Also provided is a method for making paper using a calcium carbonate filler, which method comprises:
 (a) forming an aqueous dispersion containing at least 30%, by weight, of said calcium carbonate filler, wherein the interparticulate water of said dispersion has dispersed therein at least one hydrophilic organic polymer, selected from the group consisting of starch, alginates, casein and alkali solubilized latices, said at least one polymer being capable of being rendered water-insoluble by a chemical insolubilization agent;
 (b) adding said aqueous dispersion to a paper furnish containing an aqueous solution of a chemical insolubilization agent to form intimately blended paper furnish and a suspension containing stable agglomerates of filler particles, said particles being held together by said insolubilized polymer to form said agglomerates;
 (c) forming paper from the papermaking furnish and recovering said paper.

The invention further includes a method of making paper using a calcium carbonate filler, which method comprises:
 (a) forming an aqueous dispersion containing at least 30%, by weight, of said calcium carbonate filler, wherein the interparticulate water of said dispersion has dispersed therein at least one hydrophilic organic polymer selected from the group consisting of starch, alginates, casein and alkali-solubilized latices, said at least one polymer being capable of being rendered water-insoluble by a chemical insolubilization agent;
 (b) running said dispersion into at least sufficient of said insolubilization agent to form insolubilized polymer and to produce a suspension containing stable agglomerates of filler particles, said particles being held together by said insolubilized polymer to form said agglomerates;
 (c) intimately blending a filler amount of said suspension with a papermaking furnish to form a blend having an acid pH; and
 (d) forming a paper from said blend and recovering said paper.

Yet another aspect of the invention is a method of making paper using a calcium carbonate filler, which method comprises:
 (a) forming an aqueous dispersion containing at least 30%, by weight, of said calcium carbonate filler, wherein the interparticulate water of said dispersion has dispersed therein at least one hydrophilic organic polymer selected from the group consisting of starch, alginates, casein and alkali-solubilized latices, said at least one polymer being capable of being rendered water-insoluble by a chemical insolubilization agent;
 (b) forming a suspension by adding a chemical insolubilization agent to said dispersion in a first amount which is insufficient to insolubilize all of said at least one polymer;
 (c) intimately blending said suspension with a papermaking furnish containing a second amount of said agent sufficient to ensure, together with said first amount thereof, the formation of insolubilized polymer and to produce stable agglomerates of filler particles, said particles being held together by said insolubilized polymer to form said agglomerates;
 (d) forming a paper from the papermaking furnish containing said agglomerates; and
 (e) recovering said paper.

In this specification the term "coated particles" has deliberately not been used since this could lead to misconceptions concerning the nature of the invention. It is not known what is the precise nature of the relationship between the particles and the polymer in the particle/polymer agglomerates which this specification describes. It is not known whether after the addition of the chemical insolubilization agent the polymer should be considered as, for example, a precipitate or gel. The complex is likely to be strongly hydrated, containing and immobilising much water. Adsorption of polymer on to the surface of the particles may play some part but how much is uncertain.

Accordingly, the term "insolubilization" has been used in the present specification and claims to define the relationship between the particles and the polymer. The characteristics of the agglomerates differ according to the polymer and insolubilization agent used making it difficult to define them precisely in physical terms. It may well be that in particular cases a precipitate, a coagulum or a gel of the polymeric material is formed, and, therefore, in the present description and claims agglomerates including the polymeric material in any such state and produced in the method of the invention are embraced by the general words "stable agglomerates of filler particles".

The preferred acid reactive mineral filler particles for use in the method of this invention are calcium carbonate or whiting particles.

Although calcium carbonate is mentioned generally as the filler in the description hereafter it should be understood that the method of the invention also applies to other acid reactive particulate fillers.

Apart from general considerations detailed latter the invention has particular application to fillers of calcium carbonate for use in fibrous webs which are to be sized.

A preferred way of carrying out this invention is by forming a suspension in water of calcium carbonate particles in a colloidal solution of the hydrophilic organic polymer, and adding a solution of chemical insolubilization agent. Another preferred way is to run the suspension in water of calcium carbonate particles in a colloidal solution of hydrophilic organic polymer into a solution containing the insolubilization agent, which solution may be the paper stock. The amount of hydrophilic organic polymer which gives the desired effect is about 1 to 25% by weight of the acid reactive filler solids. Generally an optimum amount is about 4% of polymer by weight based upon the amount of filler.

Insolubilization of the dissolved or colloidally dispersed hydrophilic polymer can also be caused by known methods such as salting out, by the addition of a metallic salt, by the addition of a solution of an incompatible polymer which would cause insolubilization, by the addition of a water miscible liquid which is not a solvent of the polymer(s) as well as the addition of a solvent which withdraws water from the molecules of the polymer(s). None of these methods appears, at present, to be economic.

Examples of the types of hydrophilic organic polymers which may be used as gel formers are polysaccharides such as starches especially potato starches and oxidised or anionic starches, agar-agar and pectins as well as alginates such as sodium alginate which can form an insoluble salt with a precipitant or gellant; proteinaceous compounds such as casein, especially lactic casein, and albumen; carboxylated polymers such as carboxy methyl cellulose and other carboxylated cellulose compounds; synthetic copolymers containing such monomers as acrylic acid or maleic anhydride or synthetic copolymers containing carboxy groups. Carboxylated polymers and copolymers are normally manufactured by emulsion polymerisation which provides an emulsion or latex of the acidic polymeric material which is then solubilized by alkali.

An example of a polymer or copolymer containing carboxy groups is Primal ASE-95 manufactured by Rohm and Haas Limited on addition of alkali (sodium hydroxide or ammonium hydroxide) a clear colloidal solution of the polymer results.

The different types of compounds may be used singly or as mixtures. In most applications of this invention compounds will be used by themselves or in conjunction with a second or third compound.

The preferred types of compounds which are useful are sodium alginate, starch in a raw, oxidised or anionic form, a mixture of starch in any of its forms and sodium alginate, casein, ammonia solubilized casein, ammonia solubilized acrylic emulsion and alkali solubilized acrylate or methacrylate emulsion polymers.

A sodium salt of a high molecular weight carboxylated hydrophilic compound is preferred because coagulation by alum, for example, will cause an aggregate of filler together with insolubilized polymer to acquire a positive charge. This is valuable because positively charged aggregates have the property of good retention in the paper web.

The preferred insolubilization agents which may be used are salts of multivalent metals, multivalent in this context meaning metals having a valency of two or more, or compounds containing multivalent metals. Particular examples of the cations of these salts are aluminium (papermaker's alum) calcium and zirconium. However, it is obvious that many other multivalent metal salts may be used as well as other materials which would cause the formation of multi-valent metal ions in aqueous solution. However, as has already been indicated, and will again be referred to hereinafter, the PVA/borax system of U.S. Patent Specification No. 3,257,267 is quite inoperative in the present invention.

The use of a trivalent or tetravalent metal salt solution such as aluminium sulphate is preferred because the resulting agglomerates of calcium carbonate or other fillers will acquire a positive charge and therefore have a greater tendency to bond with the cellulose fibres in the dried paper.

Hard water may also act as an insolubilization agent if the calcium carbonate suspension has been made up with certain high molecular weight organic materials in distilled water and is then added to hard water. This may be sufficient to insolubilize the polymeric material.

Many particular combinations of insolubilization agents and polymeric materials which are envisaged as useful materials when carrying out this invention are sodium alginate, starch and sodium alginate, all insolubilized by aluminium sulphate or calcium chloride, casein insolubilized by aluminium sulphate, ammonia solubilized casein, ammonia solubilized acrylic emulsion alone or in conjunction with sodium alginate solution insolubilized by calcium or aluminium ions, and starch insolubilized by zirconyl acetate.

In the simplest form of application of this invention, water soluble polymer is added to the calcium carbonate suspension before this filler slurry is added to the stock in the paper machine. It is important that addition of polymer is made to the concentrated filler slurry in colloidal solution to form a mixture or the mixture is brought into colloidal solution, and then preferably additions of insolubilization agents, such as alum, are carried out so that the polymer is immobilised around the filler particles to form agglomerates. Equally simple is the continuous addition of the suspension of filler particles in colloidal solution of polymer to an insolubilization agent solution which may be a paper stock. The stock may already contain alum, or a rosin-alum precipitate, and a further alum addition may be made later, preferably just before the paper machine wire.

Calcium carbonate is slurried with water before it is used, and with some polymers especially polymers precipitated by calcium ions, it is preferred that deionised water is used for slurrying, although this is not essential with many polymers. Natural soft water is also suitable for the suspension or slurry of calcium carbonate in water. The slurry should be as stiff as possible within the limits of the machinery available to a particular paper mill before the addition of insolubilization agent; the slurry should contain at least 30% by weight of calcium carbonate. By using a concentrated slurry of mineral particles there is a greater tendency for the formation of coherent agglomerates to occur.

The deflocculation of a concentrated aqueous slurry of filler is promoted by the use of anionic surface active agents for the purpose of forming filiform filler/polymer agglomerates. The hydrophilic organic polymer may be an insolubilizable calcium or aluminium alkali solubilized acrylic emulsion, and this should be made in a solution using deionised water. As stated above, the calcium carbonate may also be slurried in deionised water. The slurry and solution may be mixed and run at a controlled rate with good non-turbulent mixing into a dilute solution of insolubilization agent(s). Of course, the solution of such agents may be part of the paper stock. If the paper stock or furnish is slushed, beaten or otherwise treated as part of the normal stock preparation for papermaking, alum or any other soluble multivalent metal salt may be added to the stock during stock preparation. When the slurry and solution of water soluble polymer are added to the multivalent metal salt solution, aggregates of insolubilized polymer and calcium carbonate particles are formed. The size and shape of the aggregates formed depends upon the proportion of particles, insolubilizable polymer and water in the added suspension and the shear rate and/or turbulence at the site of mixing. Under optimum conditions, in which the slurry is streamed into the insolubilization agent as a separate solution or contained in the paper furnish as described below, aggregates of an essentially filiform character are formed. This has advantages, as it gives good retention in the paper web and tends to improve wet web and dry paper web strength since a filler suspension with suitable polymer, at suitable pH, can form threads on drawing out. For example, if a small amount of such a suspension is placed between two glass plates in intimate contact and the glass plates are pulled apart long strings are formed when drawing out. By the application of shear forces in the present invention filler/polymer agglomerates with a filiform character may be formed (filler-fibre-flocs).

A metod of producing such filler fibres is to cause shear forces to act upon the filler suspension in polymer solution as this is added to a solution of insolubilization agent. Shear forces are applied by running a thin stream of particle suspension with or without surfactant solution and intimately mixed with added polymer colloidal solution into a solution of the agent(s) under suitable conditions of viscous shear, such as, vigorous non-turbulent stirring. A mixture of alkali solubilized latex and casein insolubilized by papermakers' alum provides satisfactory filler fibres.

The filler-fibre-flocs are included in the paper stock and the web is formed by well known papermaking processes such that the filler is intimately dispersed through the paper sheet. On heating, i.e. during the drying of the paper web on the paper machine, bonding with the cellulose fibre occurs.

On addition of sulphuric acid or acidic papermaker's alum to a suspension of protected whiting, comprising calcium carbonate-filler/polymer agglomerates, an acidic condition is at once established. This can be remarkably persistant, tending to drift back slowly to a pH of 6 rather than rapidly to a pH of 7 as would be expected when using unprotected whiting under such conditions. With an untreated suspension of chalk whiting a rapid change of pH with evolution of carbon dioxide occurs. The difference betwen a pH of 6 and 7 is sufficient to make the process of sizing with rosin and alum practicable on the papermaking machine. The pH value of the stock can once more be used by the papermaker to control the rate of alum addition. The rate of formation of calcium ions at a given pH value is greatly reduced so that various difficulties mentioned above are mitigated. It is also possible to run the machine with the wet web on the wire of the Fourdrinier machine at a pH much nearer to 6 than is possible with untreated chalk whiting filler. This greatly reduces manufacturing difficulties such as loss of sizing, belling, the deposition of pitch on wire felts and drying rolls, the blinding of felts as well as frothing on the wire and in the headboxes.

Natural chalk whiting in particular contains a fair proportion of particles which are unnecessarily fine for filling paper. More economic papers can be manufactured by elimination of these fine particles. This normally involves a classification process, the fine product of which is economically valuable, the large particle size cut being used for paper loading. The formation from whiting particles of agglomerates held together by insolubilized polymer eliminates the necessity for this process. In this way a normal chalk whiting may be used at unexpectedly high loading levels to give papers of acceptable opacity and strength. Chalk whiting being a low cost ingredient, such papers are very competitive in raw material cost. The use of other hydrophilic water soluble or water dispersible polymers normally of high molecular weight and used in low proportions of the making stock for special papermaking purposes, such as the improvement of wire retention, is also not excluded.

The method of this invention may be carried out during the manufacture of the calcium carbonate particles so that calcium carbonate particles with reduced chemical reactivity may be supplied to a paper manufacturer who completes the manufacture of the paper web. Alternatively, the method of this invention may, for example, be carried out within a paper mill itself during stock preparation. Further, it is possible to dry the calcium carbonate particles after coating with various combinations of hydrophilic organic polymers depending upon the requirements of the paper manufacturer. Once the hydrophilic organic polymer has been mixed with the calcium carbonate and a slurry has been formed, it can be dried and used as required. On redispersion, the insolubilization agent may be contained in the water used for the redispersion or it may be contained. in the paper making furnish.

The filler particles in the novel filler/polymer agglomerates may be a considerable extent bond together and have a greater tendency to bond to the cellulose fibres in the dried paper than non-protected particles. Strength properties (tensile and particularly burst) are improved in comparison with paper made without such agglomerates. The following Examples are included for the purpose of illustrating the present invention without limiting the same.

EXAMPLE 1

This Example shows by a laboratory test that the rate of attack on natural chalk whiting by acidic alum can be reduced by suitable treatment.

A suspension of 1% W/W BWF Grade 40 natural chalk whiting was made in distilled water. 500 ml of a suspension in a beaker was stirred continuously by a magnetic stirrer and the pH value of the water (usually between 8 and 9) was determined by a glass electrode pH meter. A solution of 5.5% of iron free papermakers' alum $(Al_2(SO_4)_3 \cdot 18H_2O$ in distilled water was added in an amount such that a pH value of 7.0 was attained and remained effectively constant for at least 1 minute. A further volume of 20 ml of 5.5% alum solution was added rapidly from a beaker. The pH value fell (the water became more acid) and then rose again. The rate of pH drift towards alkalinity (high pH) was a measure of the reactivity of untreated whiting towards the acid.

Concentrated suspensions of the whiting were made and additions of solutions of insolubilizable hydrophilic organic compounds were made to give 5 parts W/W solid polymer for 100 parts whiting. Suspensions in distilled water containing 1% of solid whiting were made and tested as above. Solutions of the polymers were made without or with heat or addition of alkali by well known procedures.

The whiting was treated in aqueous suspension with the solution of polymer, the water evaporated and the mass broken up to give particles. The treated dry whiting was tested as above.

The pH value at 3 minutes after the addition of 20 ml of alum solution sufficiently indicates the efficiency of the various polymers in protecting the whiting against acid attack. Tests of various treatments for effectiveness in treating $CaCO_3$ particles against acid attack

| Tests of various treatments for effectiveness in treating $CaCO_3$ particles against acid attack | | | |
|---|---|---|---|
| Treatment material | Parts W/W Solid per 100 parts whiting | Treatment method | pH after 3 minutes |
| Control - no treatment | — | — | 6.5 |
| Anionic starch Stadex 740 (Starch Products Ltd) | 5 | dried on | 6.2 |
| Sodium alginate (p1002-Alginate Industries Ltd.) | 5 | " | 6.1 |
| Sodium alginate (P1002-Alginate Industries Ltd) | 5 | wet slurry | 6.0 |
| Anionic starch (Stadex 740- Starch Products Ltd) | 5 | " | 6.1 |
| Anionic starch/ sodium alginate | 4.5/0.5 | " | 5.8 |
| Anionic starch/ sodium alginate | 4.8/0.2 | " | 6.2 |
| Polyox WSR 301/Dispex N40 (Union Carbide Allied Colloids N40) | 4.6/0.4 | " | 6.4 |
| Primal ASE-95(Lennig Chemicals) ammonia solubilised | 5 | " | 6.2 |
| Special skin glue J9/645 (Croda Polymers/ Formaldehyde) | 5 | " | 6.1 |
| Potato Starch/Mystolene MK7 (Zirconium mixture, Catomance Ltd.) | 5 | " | 6.4 |

EXAMPLE 2

A further trial was run in a fine paper mill using a specially prepared "protected whiting" to produce an all purpose printing paper. The protected whiting was prepared using a BWF grade 40 natural chalk whiting as a slurry with the addition of 4 parts/100 by weight of an anionic starch/Stadex 740 — Starch Products Ltd.) and dried. The paper was manufactured on a machine running at 250 ft/minute from a pulp furnish of 70% bleached hardwood sulphate, 15% semi-bleached softwood, sulphate 15% bleached softwood sulphate. Loading consisted of 4% titanium dioxide plus extender and sufficient whiting to give a total loading content of 14% in the paper. The mixture of protected whiting was slurried in water and added at the blending tower with sufficient alum to give a pH value of 7.3. Further alum was added just before the breast box to give a pH of 6.8 at the wire.

Results from this trial showed the effect of the protective process as follows:
(a) some reduction in the acid addition needed,
(b) improved sizing efficiency, the rosin input being reduced from 0.9% to 0.6% during trial without loss of sizing,
(c) excellent filler retention (60–65%) on the first pass compared with previous results with untreated whiting of 45–50%,
(d) strength was maintained with improved loading retention.

EXAMPLE 3

A third trial was run in fine paper mill when an 85 gsm wood-free smooth litho printing paper was produced usin a specially prepared "protected" whiting. The protected whiting was prepared from 100 parts BWF Grade 40 whiting, 4 parts Stadex 740 and 0.4 parts sodium alginate (P1002) in a slurry and then dried. The paper was produced at 240ft/min. from a pulp furnish containing 30% esparto, 30% semi-bleached softwood sulphate and40% eucalyptus with sufficient whiting added to give a total loading content of 14%. REsults from this trial were as follows:
(a) the degree of protection from acid was clearly shown by low pH values obtained (6.1) and a 50% reduction from normal alum usage needed to return the system to neutrality,
(b) there was an absence of froth, bells or associated problems in sheet formation,
(c) size addition was reduced from 0.9% to 0.6% during the trial while hard sizing was maintained,
(d) improved overall retention of filler was achieved, 93% against a normal value of 85%,
(e) sheet strength was maintained in splte of a higher loading content, when compared to a sheet formed before the addition of 'prepared whiting' from the same furnish.

EXAMPLE 4

The fourth example was run in a paper machine running at 350 ft/min making normal imitation art paper. Normally china clay is used as the filler. This was replaced completely with protected whiting. The protected whiting was prepared as in Example 3. The protected whiting was pre-slurried with sufficient alum to give a pH of 7.3. It was added to the machine chest and more alum added just before the breast box.
Results:

(a) on a substance of 120 gsm the surface wax pick increased from 4 to 9 this being measured using the Dennison wax test,
(b) the ink penetration time as measured on the Albricht sizing tester increased from 60 seconds to 625 seconds,
(c) the overal retention of filler in the paper was above 90%,
(d) the loading in the paper was increased from 18% to 25% without loss in burst strength.
(e) no problems such as 'dandy belling' frothing etc. occurred on the machine.

EXAMPLE 5

The fifth trial was held using a paper machine making esparto book wove the fibre furnish being 70% esparto and 30% wood-free clay-loaded broke. The machine speed was 230 ft/min and the protected whiting completely replaced the china clay which is the normal filler used. The protected whitin was prepared as in Example 3. It was preslurried without alum addition. The filler and alum were added together just prior to the breast box in a continuous stream. The breast box pH was 6.7 to 6.8.
Results:
(a) at the commencement of the trial the substance increased from 77½ gsm to 103 gsm due to the very high retention of the protected whiting,
(b) the opacity increased from 92 to 96,
(c) the Cobb test was 17 throughout the machine run,
(d) the loading in the paper was increased from 12% to 23% without any loss in paper strength,
(e) the surface pick was constant at 12/14,
(f) again the trial was completely trouble-free on the machine there being no evidence of frothing or dandy belling.

EXAMPLE 6

Paper having a bleached sulphite furnish (45 gsm basis wt) was made on a pilot scale paper machine.
The protected whiting was produced as follows:
500g lactic casein (60 mesh) soaked overnight in 5 liters of water, 250cc of 10% sodium hydroxide was stirred in and the mixture again allowed to soak overnight. Live steam was injected causing the casein to dissolve. 500g of 10% ASE-95 (Lennig Chemicals) were mixed with 250 ml of 10% sodium hydroxide and 4250ml of water and were left to soak overnight. The whiting slurry was formed from 20Kg water and 28Kg chalk whiting Grade 40 and mixed with a hand paddle. This was allowed to stand overnight. Supernatent liquid was removed to leave a slurry having 71% solids. 300g Calgon S were dissolved in 3 liters of water. The constituents were mixed in the following order and in the following amounts; 10K slurry, 100G Calgon solution, 2500g hot casein solution and 480g ASE 95 solution.
The suspension was run in a thin stream at the turbulent mixing box of the machine together with alum solution. The basis wt of the paper rose to 150 gsm and there were no machine breaks. The filler was seen to be in the form of filiform flocs.

EXAMPLE 7

The chalk whiting was treated as in Example 6 to produce a protected whiting.

A polythene bucket was half filled with 5 liters of distilled water and this was brought to pH 4.0 with 10% papermakers alum solution. A fast stirrer was used to create a good vortex. The above suspension was poured into the edge of this vortex in a very thin stream. Filiform flocs or fibres were formed and the polymer insolubilized so that they did not break up. It was important that the stream of suspension entering the alum solution was continuous and unbroken.
On microscopic examination, the flocs or filiform aggregates were seen to be similar in dimension to those of lightly beaten bleached sulphite paper pulp.

EXAMPLE 8

The development of sizing by the rosin/alum process depends upon the pH value of the fibre plus filler stock at the times of paper web formation and of drying. After an addition of alum solution to a papermaking stock containing calcium carbonate, untreated or treated by the process of the invention, the pH value changes due to chemical reaction. One advantage of the present invention is that it enables the rate of rise of pH to be decreased so that the paper can, by the normal continuous manufacturing process, be made and dried under acid conditions, so that sizing is effective. Using noncontinuous standard paper-forming methods in the laboratory this cannot, however, be demonstrated.
Furthermore, it is not possible in the laboratory to imitate the 'shake' of a paper-forming web on a full scale machine. This means that in the laboratory sheetformer, the stock of fibre and filler has to be very dilute to give a 'formation' or distribution of filler and fibre equivalent to that obtained on a full scale papermaking machine at a much higher consistency.
Th difficulties in the use of laboratory methods to predict full scale paper-machine results for sizing and filler retention are known and accepted throughout the paper manufacturing industry. However, full scale paper mill trials using the method of the present invention have proved most satisfactory and the paper manufactured has been accepted by the paper mill for smoothness and printability.
Despite the indicated difficulties, handsheets can however, be prepared by the method of the invention to demonstrate that smooth paper can be made in the laboratory under conditions comparable to a control. Again, it must be remembered that full scale papermachines employ 'cleaners' to remove the odd oversize bit of fibre or dirt. Laboratory handsheets prepared without any equivalent cleaning process are difficult to prepare free from the occasional effect. These are equally present in the sheets prepared according to the invention and in the control employed. The details of the demonstrations are given below.

(A)CONTROL; Example of paper containing untreated filler.

Sheets containing whiting filler 13% on O.D. sheet weight.

Method of Preparation

International Bleached Kraft paper pulp equivalent oven dry (O.D.) weight 360 g. was beaten in 23 litres of tap water (hardness 240 ppm) as calcium carbonate in a laboratory Valley beater to a Canadian Freeness value of 300°. A suspenson of 600 g Snowcal 6ML Natural Chalk Whiting (Cement Marketing Co. Ltd., England) in 400 ml of tap water of the above hardness was dispersed by a high speed laboratory stirrer for 30 minutes, when it was smooth and free from lumps. An equivalent to 24 g O.D. pulp of the beaten pulp stock was disintegrated in a British Standard disintegrator for 15,000 revs., transferred to a bucket, made up 8 litres, and 12 g of the 60% whiting suspension added. The filler was mixed into the pulp for 10 minutes by a mechanical stirrer. To this, 36 ml of a 0.01% solution of a cationic polyacrylamide retention aid (Percol 140 Allied Colloids Ltd., Bradford, England) was added and mechanically stirred in for 20 seconds. Under the microscope it could be seen that the filler particles were clustered round the fibres.

Handsheets were made by the standard procedure using 420 ml of the above pulp/filler suspension diluted to 10 litres in the sheet-forming machine, couch rolling, transferring to blotters and discs and air drying in rings.

(B) Example of paper made by the method of the invention.

Sheets containing 10.2% filler as calcium carbonate calculated on O.D. sheet weight. Filler/polyer suspension agglomerated by addition to alum solution.

Stock as for A was disintegrated and bulked to 8 litres in a bucket. A suspension of Snowcal 6ML and polymer was prepared as follows.

Polymer Solution A

The following polymers were run in a stream into mechanically stirred water:

| | |
|---|---|
| Special Starch, Stadex 740 (Starch Products Ltd., Slough, England) | 32.0 g |
| Sodium alginate, Welgum WHFA (Alginate Industries Ltd., London, England) | 3.2 g |
| Deionised water | 364.8 g |

Stirring was continued while the temperature was raised to 60° C in 30 minutes. The solution was then free from lumps; 160 ml of deionised cold water was added and mixed in.

Whiting Slurry B

Chalk Whiting Snowcal 6ML, 500 g, was mixed by high speed stirring for 30 minutes into 325 ml deionised water.

Suspension C of whiting in polymer solution

Whiting suspension B, 660 g, was added to 280 g of polymer colloidal solution A with mechanical stirring for 5 minutes. The mixing was then effectively smooth.

Filler Agglomerate Suspension D

A solution of 0.05% papermakers' alum in deionised water was prepared, and 250 ml of this was mechanically stirred in a beaker so that a 'downstream vortex' was formed. A syringe was filled with suspension C of whiting in polymer solution and 15 ml was run into the vortex of the alum solution. Stirring was continued for 1 minute and the suspension agglomerates which was formed was added at once to prepared pulp stock as below.

Suspension of Pulp with filler agglomerates, and sheetmaking

A bucket of 8 litres of beaten and disintegrated pulp as before was prepared and the pH value adjusted to 5.8 by addition of 2N sulphuric acid from a burette. The suspension D of filler agglomerates (265 ml) was added and mechanically stirred in for 4 minutes. The stock had the appearance of distinct agglomerates of fibre diameter dimensions.

Handsheets were prepared as before.

(C) Examle of paper made by the method of invention

Sheets containing 13.1% filer calculated as calcium carbonte on O.D. Sheet. Filler/polymer suspension agglomerated by addition to pulp suspension containing alum.

A bucket of 8 litres of pulp prepared as before was brought to pH 5.4 with 2N sulphuric acid and 100 ml of an 0.5% solution of papermakers' alum was added. From a syringe, 11 ml of suspension C (whiting in polymr solution) was run into a downstream vortex in the mechanically stirred pulp suspension. Stirring was continued for 2 minutes. Under the microscope the agglomerates formed were less uniform in particle size than in the case of suspension E.

An addition of 36 ml of 0.01% Percol 140 was then made and mixed in as before. Handsheets were then prepared.

Comparison of the Sheets

On examination of the various sheets it was seen that by the method of the invention acceptable paper can be made, even in the laboratory. Under full scale manufacturing conditions the results are acceptable to papermakers and printers.

There now follows a further series of Examples, the purpose of which is to indicate the differences between the present invention and the prior art represented by U.S. Pat. No. 3,257,267 (see earlier).

Example 2 of U.S. Pat. No. 3,257,267 described the formation of a gel from PVA/borax.

At first glance, the preparation of a suspension of chalk whiting in PVA and comminution of this into a solution of borax might seem to be one way of carrying out the method of the present invention since the entities formed are rubbery and strong. There is also a potential advantage that they would be expected to melt and bond to the fibres when the paper sheet is dried. This approach has, however, proved totally valueless for a reason which has only recently been understood. With the formulation and procedure which is being utilized by paper mills, and which is based on the formation of whiting agglomerates held together by starch/sodium alginate, insolubilized by alum, such agglomerates are stable. The polymer/alumina structure which has been produced does not swell in water, and the agglomerates persist in a papermaking system. In the case of PVA/borax the gel formed is subject to imbibition. This means that when immersed in water the gel absorbs water and swells, becoming continuously weaker in the process. Agglomerates of whiting/PVA/borax on immersion in water immmediately begin this swelling process, and start the disperse into a cloud of separate whiting particles. The formation of the stable agglomerates required by the present invention is not possible by such means.

EXAMPLE 9

This Example is based on a high molecular weight fully hydrolysed PVA which is known to give the strongest gel structure with borax. This is Mowiol 66–100 from Harlow Chemical Co. Ltd., Temple Fields, Harlow, Essex. A solution of this was prepared in distilled water by soaking and heating to near boiling, as is customary in the art.

| A | Mowiol 66–100 | 30 |
|---|---|---|
|   | Distilled water | 570 |
|   |   | 600 |

A dispersion of natural chalk whiting was made in part of the above solution, using mechanical mixing. With PVA this is not a very convenient operation, due to the formation of lumps which need dispersing. PVA is liable to the phenomenon of thickening or lumping known as colloidal shock. The following formula was prepared.

| Solution A | 100 g |
|---|---|
| Snowcal 6ML | 150 g |
|   | 250 g |

This suspension conains 3.3 parts of PVA for 100 parts of the whiting. PVA is an expensive material comparable in cost to sodium alginate, and the proportion of polymer is considerably higher than would be economically possible in practice. A portion of this suspension was injected by a hypodermic syringe into a saturated solution of borax. A solution of this strength is much greater than would be acceptable in practice. An extreme case has been chosen in order to demonstrate the impossibility of using this operation in practice. The threads of suspension immediately formed rubbery strings on contact with the borax, which initially was a clear liquid. In a very short time, however, the top liquid began to show a cloud of particles which under the microscope were ween to be separate particles of chalk whiting. If an economic process of comminution of the PVA/whiting agglomerates to a particle size of around 20$\mu$ can be developed it is clear that almost immediate swelling and disintegration to a cloud would occur.

In contrast, the following formulation in accordance with the invention was prepared.

EXAMPLE 10

A solution of a mixture of polymers was made similarly to the last Example. The polymers were an anionic starch, Starch 740, manufactured by Starch Products Ltd., Slough, Bucks, and sodium alginate Welgum WHFA, manufactured by Alginate Industries Ltd., 22 Henrietta Street, London, W.C. 2. The polymers, as dry powders, were mixed into distilled water and the temperature raised to 60° C with mechanical stirring. The following solution was obtained.

| Formula A |   |
|---|---|
| Stadex 740 | 32.0 g |
| Welgum WHFA | 3.2 g |
| Distilled water | 364.8 g |
|   | 400.0 g |

A smooth solution was obtained at 60° C.

A suspension of Snowcal 6ML in distilled water was prepared as formula B.

| Formula B |   |
|---|---|
| Snowcal 6ML | 500 g |
| Distilled water | 325 g |

| Formula B |   |
|---|---|
|   | 825 g |

200 g. of solution A was thinned with 80 g of distilled water and allowed to cool. This was mixed with hand stirring into 660 g of whiting suspension B. A smooth, lump free suspension was obtained (suspension C).

Using the hypodermic syringe, threads of suspension C were injected into a solution of 0.5% papermakers' alum in distilled water. Threads were formed which were much more brittle than in Example 9, but which did not disperse to a cloud except under mechanical agitation which was sufficient to break up the agglomerates.

The complete difference in character of the agglomerates formed in the two processes can be clarified by reference to a paper by H. Beltman and J. Lyklema, "Rheological monitoring of the formation of Polyvinyl Alcohol — Congo Red Gels," The Chemical Society Faraday Division General Discussion No. 57. On the penultimate page, Lyklema states: "Phenomenologicaly, the PVA-borax system behaves as a highly viscous gel, in which self-healing takes place after disrupture. The average life time $\pi$ of a cross-link is about $\frac{1}{4}$ s at room temperature." This means that a PVA-borax gel when immersed in water is subject to a constant breaking and rejoining of the gel-forming cross-links. This enables water molecules to penetrate into the gel, which thus swells continuously, leading to weakening and disintegration. The rate of swelling is such that with commercially practicable formulations disintegration occurs before paper can be formed. The PVA-borax system is thus one which is useless for the present invention.

Hay refers to the incorporation of additaments, includng calcium carbonate filler, into a protective matrix of a thick aqueous gel of polymer solution. He then produces by mechanical means small particulate masses of the gel-embedded additament. These masses have such high viscosity that they do not flow or coalesce when suspended in water. The small particulate masses need to be smaller than the thickness of the fibrous web in which they are incorporated.

The patent suggests the use of a high-pressure airless spray gun to produce gel-embedded additament particles in air or in water. Alternatively, an extruder with a cutter can be employed. The gel/additament mass may be broken up if in a sufficiently concentrated crumbly state, in a muller.

The patent discloses the formation of masses of gel-embedded additament particles. paper, or more particularly, board, can be made from cellulose fiber and suspensions of the masses because under pressure these deform, and a reasonably smooth sheet results. The word 'masses' is used for the entities provided by Hay because in Example 1 thereof these are mechanically prepared by extruding gel-embedded borax through holes 0.040 inch, or about 1 mm, in diameter, the rodlets so formed being mechanically chopped. It is well known in the art of extrusion that gelatinous masses containing particles are liable to the phenomenon of die swell. This means that the diameter of an extruded rod is larger than the diameter of the orifice through which it is extruded. In fiber manufacture this is overcome by processes of drawing, which are inapplicable to the present case because gels of the types described in the Hay Examples cannot be drawn. The masses produced by Example 1 must, therefore, be considerably greater in cross section than 0.040 inch. This is about 1000μ and needs to be compared with the cross section of a normal paper fiber, which is about 30μ.

The essence of U.S. Pat. No. 3,257,267 is, therefore, to prepare by mechanical means masses of gel-embedded additament particles which are much larger than paper fibers and would not enable normal paper to be made. In normal paper any filler particles much larger than the fibers would not be acceptable because of roughness. Hay appears to be claiming to overcome this because of the conformation or change of shape of the gel masses under pressure. It is quite clear therefore that a rather unusual paper or board would result.

The principle of operation of the present invention is completely different. According to this, filler agglomerates are prepared which are in practice comparable in size to cellulose fibre cross dimensions. The method employed to make these agglomerates is one of mixing of a thin, non-gelatinous particulate suspension with or into a solution of a material which interacts chemically or physicochemically with the polymer to insolubilize the same. Without this interaction the primary particles of filler would disperse into the water, and no agglomerates would form.

There is no mention in U.S. Patent Specification No. 3,257,267 of the printing of papers prepared by the process. It is difficult to imagine that with areas of filler produced by squashing or compacting a mass of gel-embedded filler particles at least 1 mm in cross-section the printability would be acceptable.

EXAMPLE 11

To make the above point clear, the following expeiments were carried out as nearly as possible following Hay's Example 1. Using a laboratory mixer for agitation, an aqueous gel was prepared by adding to 300 ml of deionised water heated to 80° C, 5 g of methyl cellulose sold commercially by British Celanese Ltd. as Celacol M2500. When dispersed, the mix was cooled, when the methyl cellulose dissolved and formed a gel. A thin gel was obtained on addition of 200 ml of deionised water.

10g. of commercial sodium pentachlorophenate dissolved in 100 ml of deionised water was added to this gel under agitation; cross linkage produced a smooth gel of consistency too thick to pour. An addition of paraffin emulsion was not made as this appeared irrelevant to the operation of the process. It was noted that when the gel was cut by a knife into large lumps and allowed to stand overnight it flowed together to form one mass. To 100 g. of this gel there was added different amounts of Snowcal 6ML filler. With an addition of 600 g. of filler the consistency was grainy and appeared to be of "good extrusion consistency".

Samples of this filler/gel paste were immersed in water when at once a cloud of individual particles detached themselves from the surface. It was therefore clear that if samples of paper were to be made this would have to be carried out very rapidly, otherwise any gel/filler entities would become completely dispersed. Accordingly a standard handsheet apparatus was prepared by filling it with tap water (hardness ca. 240 p.p.m. as calcium carbonate) in which was suspended 1.2 g. of Intercontinental bleached kraft chemical papermaking pulp which had previously been beaten to a Canadian Freeness of 300° C. A sample of the filler gel prepared as above was squeezed through the meshes of a British Standard sieve having a mesh aperture of 1000 microns. This is equivalent to the "perforated plate having holes 0.040 inch in diameter" described in Hay's Example 1. The extruded masses were dropped into tap water in a container (a dense cloud of single particles forming at once) and as rapidly as possible transferred to the sheet former. After standard stirring procedure the sheets were formed. The "back water" which came through the wire mesh on which the paper handsheets were formed was of a cloudiness which would be unacceptable in a papermaking process.

Some sheets were removed carefully from the wire mesh with the normal couching and pressing process. These showed upstanding lumps which were patently obvious on showthrough. Even from the wire side the lumps were quite visible. Other sheets were pressed by the standard sheet forming procedure. The claim made by Hay that the lumps are pressed out is validated. They no longer obtrude from the sheet but nevertheless are still obvious as separate entities within the sheet. The sheets which were made could in no way be termed as passable paper. In particular, the general opacity is very poor. Opacity of paper sheets results from a good distribution of the filler particles throughout the whole of the sheet with the avoidance of local lumps. In these sheets all the opacity "resides in the lumps". The operation of the present invention, in contrast, gives smooth sheets with acceptably uniform opacity.

In Example 4 of U.S. Pat. No. 3,257,267 it is stated that "Examination of the web indicate that the pressure had caused the particulate masses to shear and to spread to such an extent that their presence as discrete particles was not noticeable". It is necessary to point out, however, that the material made was a board and not a paper. Rigid wood fibre insulation board does not require to have the quality and uniformity of a paper. The present inventon is specifically concerned with the manufacture of paper and not a crude board.

It might be claimed that other mechanical methods of producing the masses of gel-embedded additament particles might make them small enough to overcome this objection. Hay suggests 50μ as a minimum size. There is, however, a logical difficulty. If the masses of gel-embedded additament particles are so stiff as not immediately to disperse in the water of a paper-making machine, they are then too stiff to prepare small particles by any of the Hay methods. Experiments have been carried out using extrusion methods (including a high-pressure spray gun projecting into air or water), and also using the muller method disclosed. In no case was the difficulty described above overcome. In order to provide masses or agglomerates of the size required, the liquid sprayed or extruded had to be of such a thinness that on mixing into water, dispersion to fundamental particles was immediate. Agglomerates of the required size could not be mechanically prepared without a process of insolubilization of a nongelatinous thin suspension.

EXAMPLE 12

Example 3 of U.S. Pat. No. 3,257,267 might seem to be the most hopeful to modify so as to produce paper of the required printability. Accordingly, 10 g of sodium alginate was dissolved in 490 ml of distilled water. This was done by a better method than that disclosed. The sodium alginate was mechanically stirred into the cold water, which was then heated to 60° C and then cooled. It did not seem helpful to prepare a mixture with 1000 g of powdered monoammonium phosphate, because the viscosity of particulate suspensions depends very greatly on the particle size distribution of the powders in suspension, and no indication is given of this in the Example; therefore a standard calcium carbonate filler was used. This was Snowcal 6ML, natural chalk whiting, sold by the Cement Marketing Co. Ltd. The following mixes were prepared.

| Sample | 1 | 2 | 3 | 4 | 5 | 6 | 7 | 8 | 9 |
|---|---|---|---|---|---|---|---|---|---|
| Sodium alg. solution | 50 | 50 | 50 | 50 | 50 | 50 | 50 | 50 | 50 |
| Filler | 100 | 150 | 200 | 250 | 300 | 350 | 400 | 450 | 500 |

Samples 1 and 2 were reasonably thin. They were extruded from the nozzle of a hypodermic syringe with a No. 1 needle (internal diameter about 0.3 mm) which had been cut down. Threads were formed of 0.5 to 1.0 mm diameter, unacceptably large for normal papermaking operations. On dropping these into water, dispersion immediately occurred, showing that there was insufficient gel structure to give the stability claimed by Hay. Sample 3 was too stiff to extrude; Sample 4 was even worse; Sample 5 was a crumbly mass. This was treated in a laboratory muller, as suggested by Hay, when grains about 2 mm diameter were formed. On dropping these into water a cloud formed at once, showing that they were not stable to dispersion. As the proportion of filler was increased in Samples 7, 8 and 9, the size of the lumps formed by the mulling operation decreased. The rapidity of dispersion to a cloud of filler particles in water increased, until with Sample 9 (where the particles were still insufficiently fine to give good paper) a cloud was formed even on immersion in a saturated gypsum solution in water. The immersion in a calcium salt solution is suggested in the Hay specification. Any calcium salt solution stronger than saturated gypsum water would be unacceptable in paper-making operation.

EXAMPLE 13

In a further attempt to use the Hay principle of the production of the gel-embedded additament particles by mechanical means to provide particles which might be useful n the present invention the following mixings were prepared.

| Polymer Solution A | |
|---|---|
| Anionic starch (Stadex 740, Starch Products Ltd.) | 32.0 g |
| Sodium alginate (Welgum WHFA, Alginate Industries Ltd.) | 3.2 g |
| Distilled Water | 364.8 g |
| | 400.0 g |

The polymers were brought into colloidal solution at 60° C by mechanical stirring (30 minutes). Solutions, more concentrated than the above, are difficult to prepare in practice by simple stirring plant due to risk of local overheating.

While the polymer solution was hot and thin, the following mix was made

| Whiting Polymer Suspension B | |
|---|---|
| Colloidal Polymer Solution A | 50 g |
| Chalk Whiting Snowcal 6ML (CMC Ltd.) | 150 g |
| | 200 g |

Lumps formed during the mixing such that on a full scale, milling equipment such as a triple-roll mill would be needed to give a smooth product. This is a major impediment in the process. In the laboratory a mechanical muller was used. The superiority of the mixing process in the present patent application which uses simple mixing equipment without lump formation is evident.

Mixture B had the proportions of polymer to filler which have been found economic in practice in the application of the present invention. It was stiff and gelatinous. It was found impossible to extrude this though a hypodermic syringe with a No. 1 needle cut short: this is practicable with the suspensions of the consistency of those used in the present patent application. (Even with these, the phenomenon of die swell and the impossibility of drawing the threads down to a lower diameter means that threads or lumps are produced which are over large for papermaking.) This mixture was threfore cut into lumps and these were added to distilled water in a beaker. The water was swirled gently to imitate the motion in a paper machine stock. At once dispersion to give a fine cloud was evident. In a short time the lumps disintegrated.

This dispersion to a fine cloud is a phenomenon dependent upon gel-swelling (imbibition) and on washing particles off the swollen surface. Regardless how thick the gels are, provided the polymers are in solution or colloidal solution, this imbibition and dispersion will occur. To avoid this, a chemical change in the state of the polymer dispersion is needed — reaction with a chemical substance to change the gel from one which shows imbibition (because of the solubility of the polymers) to one which shows syneresis or expulsion of water (because of the insolubility of the polymers). Hay presumably hopes to make the paper before this dispersion occurs. The present invention avoids this difficulty, since agglomerates of chemically reacted and 'insolubilised' polymers are not subject to this swelling and dispersion.

EXAMPLE 14

To demonstrate further the present invention the following mixings were prepared.

| Method of the Invention | |
|---|---|
| Polymer Solution C | |
| Anionic starch (Stadex 740, Starch Products Ltd.) | 32.0 g |
| Sodium alginate (Welgum WHFA, Alginate Industries | 3.2 g |
| Distilled Water | 364.8 g |
| | 400.0 g |

The polymers were brought into colloidal solution at 60° C by mechanical stirring. This is as Polymer Solution A, (Example 13), but here, while hot, an addition of 160.0 g of distilled water was made so that the mix was fluid and not gelatinous when cold.

| Whiting Suspension D | |
|---|---|
| Chalk whiting (Snowcal 6ML) | 500 g |

-continued

| Distilled water | 325 g |
| --- | --- |
| | 826 g |
| Whiting/Polymer Suspension E | |
| Whiting Suspension D | 660 g |
| Polymer Solution C | 280 g |
| | 940 g |

D was added to C with hand stirring to give a paint consistency suspension of 42.5% solids with good flow properties.

The good flow properties help greatly to ease the problem of making small agglomerates, in contrast to the gel properties specified by Hay which require mechanical means to make the gel enclosed additaments.

| Suspension of agglomerates F | |
| --- | --- |
| A solution of insolubilising chemical was prepared. | |
| Distilled water | 500 g |
| 1% Papermakers' alum | 8 g |

This gave a normal papermaking pH value of 5.5. This was mixed with a laboratory stirrer, placed off centre to give a 'downstream vortex'. Whiting/polymer suspension E, 4 g, was poured into this vortex. Agglomerates formed which rapidly settled to give a clear supernatant liquid. The suspension of agglomerates was then added to a papermaking pulp suspension as follows:

| Papermaking Stock with filler according to the invention, G | |
| --- | --- |
| Pulp suspension[1] | 250 g |
| Distilled water | 238 g |
| Agglomerate Suspension F | 512 g |
| | 1000 g |

[1]Intercontinental bleached kraft chemical pulp beaten in laboratory Hollander to a freeness of 30° Schopper Riegler and reduced to a solids content of 1.6% w/w.

Mechanical stirring was continued for 5 mins. A sample was retained for photomicrography.
Ths is based on the following acceptable papermaking proportions:

| Cellulose fibre | 0.4% solids content |
| --- | --- |
| Papermakers' alum | 2% w/w - 4% to fibre |
| Chalk whiting filler | 42.5% w/w to fibre |

An alternative method was also exemplified, in which the filler/polymer suspension was added to pulp suspension containing alum.

This method is less useful than the first because in practice the stock will contain some calcium carbonate, e.g. from backwater or broke; because of this and the greater dilution, more alum is needed to lower the pH than where agglomeration occurs in a smaller volume of straight alum solution. The presence of the fibres can also upset the change from colloidal solution/suspension to agglomerates.

The following suspension was prepared.

| Papermaking Stock with filler according to invention, H | |
| --- | --- |
| Pulp suspension as before | 250 g |
| Distilled water | 750 g |
| 1% alum solution | 12 g |

The alum was increased to 3% to the pulp.

As before, 4.0 g of whiting/polymer suspension E was added with mechanical mixer for 1 min. and a sample retained for photomicrography.

Control Samples

Control - Standard Papermaking Stock with Filler

The following papermaking stock was prepared.

| Control or Standard Sample J | |
| --- | --- |
| Pulp suspension[1] | 250 g |
| Distilled water | 750 g |
| 60% suspension of Snowcal 6ML in distilled water | 2.8 g |

These were mixed mechanically and a sample retained for photomicrography.

Control or Standard Sample K

This was prepared by the same method as paper stock H by addition of suspension E to pulp suspension but without alum.

Control or Standard Sample L

This was prepared as Sample K but the alum was added after the suspension E addition had dispersed. The alum addition was as in Sample H.

The accompanying drawings show the photomicrographs produced from the samples prepared in accordance with this Example.

Photomicrographs were prepared from samples 24 hours old an were taken at a magnification of 100. The figures of the drawings are as follows:

| FIG. 1 | Pulp with whiting | Sample J; |
| --- | --- | --- |
| FIG. 2 | Pulp with whiting/polymer suspension | Sample K; |
| FIG. 3 | Pulp with whiting/polymer suspension and final addition of alum | Sample L; |
| FIG. 4 | Pulp with agglomerates prepared according to the invention from whiting/polymer suspension and alum solution | Sample G; and |
| FIG. 5 | Pulp with agglomerates prepared according to the invention by addition of whiting/polymer suspension to pulp suspension containing alum. | Sample H |

Contentions demonstrated

Figure 1:
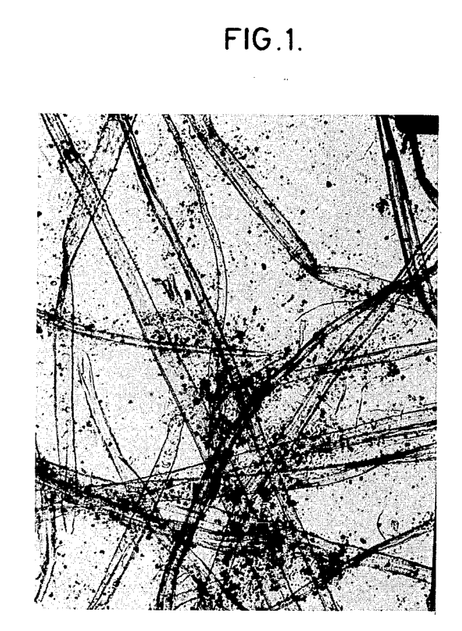

FIG. 1: Filler added to pulp suspension gave a filler dispersion and did not give agglomerates according to the invention.

Figure 2:
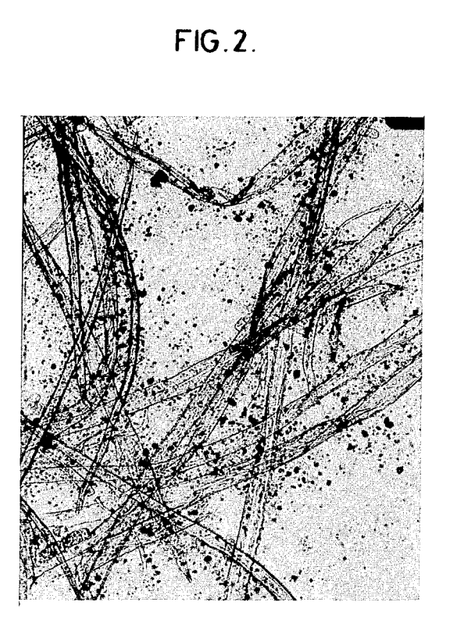

FIG. 2: Addition of filler plus polymer suspension to pulp suspension gave a filler dispersion and did not give agglomerates according to the invention.

Figure 3:
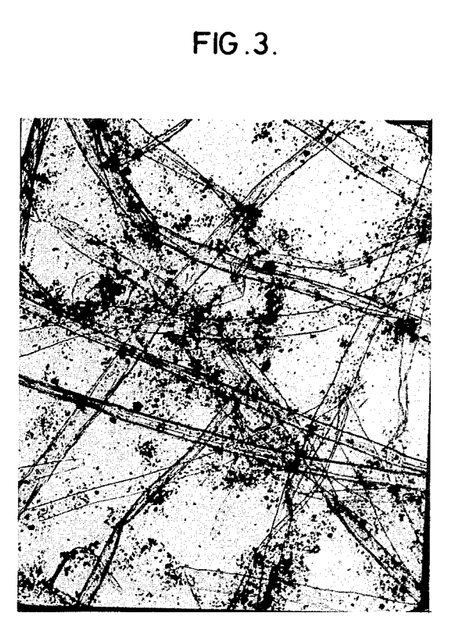

FIG. 3: Addition of alum to stock with a dispersion of filler particles from a filler plus polymer suspension did not give agglomerates according to the invention. There was some evidence of flocculation onto the fibres.

Figure 4:
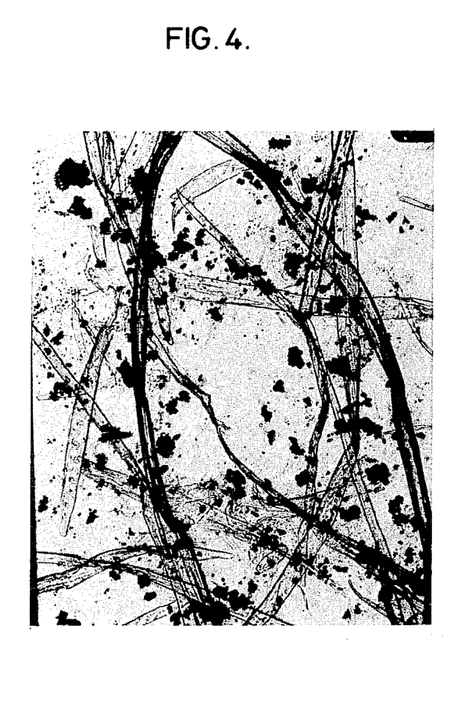

FIG. 4: Addition of filler plus polymer suspension to alum solution and then to stock gave agglomerates according to the invention. These agglomerates were of a suitable size not to cause paper roughness, and the reduction in filler surface area was such that they would interfere little with fibre/fibre bonding. Acid-reactivity was notably decreased so that rosin-alum sizing could be carried out.

Figure 5:
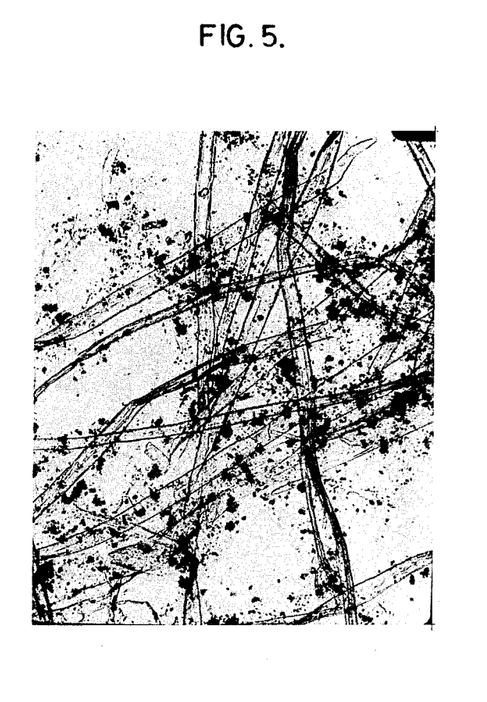

FIG. 5: Addition of filler plus polymer suspension to fibre suspension containing alum gave agglomerates but there were more fine particles present than are shown in FIG. 4. Satisfactory paper could nevertheless be made with the advantages of the invention using this pulp plus filler suspension.

In conclusion, a degree of stability of the agglomerates was obtained by the method of the present invention which could not be obtained by any method suggested by Hay. Photomicrographs of the dispersion produced by the Hay method were not prepared because agglomerates small enough to be photographed could not be prepared. After a mixing similar to that given to Sample G (FIG. 4) it is evident that the Hay method would have given a result similar to that shown in FIG. 2 since immediate dispersion even from the surface of large lumps occurred in a beaker of distilled water. The method of the invention is thus fundamentally different from that of Hay.

The agglomerates of the invention are fundamentally different from anything known in prior art or practice where filler is mixed into stock with or without polymer and alum added (FIG. 3).

The ease of operation of the present invention using non-gelled filler plus polymer suspensions with an insolubilising agent is shown in the above comparisons with the methods disclosed by Hay. It can be operated in papermills using their normal equipment - no high pressure sprays or extruders are required.

I claim:

1. A method of making paper using an acid reactive mineral filler which permits the use of an acid pH, which method comprises:
   (a) forming an aqueous dispersion containing at least 30%, by weight, of said acid reactive mineral filler, wherein the interparticulate water of said dispersion has dispersd therein at least one hydrophilic organic polymer selected from the group consisting of polysaccharides, proteinacious compounds, hydroxylated polymers and alkali solubilized latices, said at least one polymer being capable of being rendered water-insoluble by a chemical isolubilization agent;
   (b) treating said dispersion with at least sufficient of said insolubilization agent to form insolubilized polymer and to produce a suspension containing stable agglomerates of filler particles, said particles being held together by said insolubilized polymer to form said agglomerates:
   (c) intimately blending a filler amount of said suspension with a papermaking stock to form a blend having an acid pH; and
   (d) forming a paper from said blend and recovering said paper.

2. The method as claimed in claim 1 wherein said acid reactive mineral filler is calcium carbonate.

3. The method of claim 2 wherein said at least one hydrophilic organic polymer is starch and alginate and said insolubilization agent is a solution of papermakers' alum.

4. The method of claim 2 wherein said at least one hydrophilic organic polymer is an alkali solubilized acrylate or methacrylate emulsion polymer and said agent is a solution of papermakers' alum.

5. The method of claim 2 wherein said at least one hydrophilic organic polymer is starch and said agent is zirconyl acetate.

6. The method of claim 1 wherein said at least one hydrophilic organic polymer is casein and said agent is a salt of a multivalent metal selected from the group consisting of aluminium, calcium and zirconium cations.

7. The method of claim 6 wherein said acid reactive filler is calcium carbonate.

8. The method of claim 1 wherein said filler and polymer(s) of step (a) are dried, redispersed in water and subsequently subjected to the insolubilization of step (b).

9. The method of claim 1 wherein said filler and polymer(s) of step (a) are dried and the polymer(s) insolubilized by redispersion in water containing said agent.

10. The method of claim 1 wherein said filler and polymers(s) of step (a) are dried, said agent being contained in the paper making furnish of step (c).

11. The method of claim 1 wherein said at least one hydrophilic organic polymer is starch.

12. The method of claim 2 wherein said at least one hydrophilic organic polymer is starch.

13. The method of claim 1 wherein said at least one hydrophilic organic polymer is an alginate.

14. The method of claim 2 wherein said at least one hydrophilic organic polymer is an alginate.

15. The method of claim 1 wherein said at least one hydrophilic organic polymer is casein.

16. The method of claim 2 wherein said at least one hydrophilic organic polymer is casein.

17. The method of claim 1 wherein said at least one hydrophilic organic polymer is an alkali solubilized latex.

18. The method of claim 2 wherein said at least one hydrophilic organic polymer is an alkali solubilized latex.

19. The method of claim 1 wherein said insolubilization agent is papermakers' alum.

20. The method of claim 2 wherein said insolubilization agent is papermakers' alum.

21. A method of making a paper using a calcium carbonate filler, which method comprises:
   (a) forming an aqueous dispersion containing at least 30%, by weight, of said calcium carbonate filter, wherein the interparticulate water of said dispersion has dispersed therein at least one hydrophilic organic polymer selected from the group consisting of starch, alginates, casein and alkali-solubilized latices, said at least one polymer being capable of being rendered water-insoluble by a chemical insolubilization agent;
   (b) treating said dispersion with at least sufficient of said chemical insolubilization agent and to produce a suspension containing stable agglomerates of filler particles, said particles being held together by said insolubilized polymer to form agglomerates;
   (c) intimately blending a filler amount of said suspension with a papermaking stock to form a blend having an acid pH; and
   (d) forming a paper from said blend and recovering said paper.

22. The method of claim 21 wherein said aqueous suspension resulting from step (b) is continuously streamed into said papermaking stock in step (c).

23. A method of making paper using a calcium carbonate filler which method comprises:
   (a) forming an aqueous dispersion containing at least 30%, by weight, of said calcium carbonate filler, wherein the interparticulate water of said dispersion has dispersed therein at least one hydrophilic organic polymer, selected from the group consisting of starch, alginates casein and alkali solubilized latices, said at least polymer being capable of being rendered water-insoluble by a chemical insolubilization agent;

(b) adding said aqueous dispersion to a paper furnish containing an aqueous solution of a chemical insolubilization agent to form intimately blended paper furnish and a suspension containing stable agglomerates of filler particles, said particles being held together by said insolubilized polymer to form said agglomerates;

(c) forming paper from the papermaking furnish and recovering said paper.

24. The method of claim 23 wherein said at least one polymer is an alkali solubilized latex and casein and said agent is papermakers' alum.

25. A method of making paper using a calcium carbonate filler, which method comprises:

(a) forming an aqueous dispersion containing at least 30%, by weight, of said calcium carbonate filler, wherein the interparticulate water of said dispersion has dispersed therein at least one hydrophilic organic polymer selected from the group consisting of starch, alginates casein and alkali-solubilized latices, said at least one polymer being capable of being rendered water-insoluble by a chemical insolubilization agent;

(b) running said dispersion into at least sufficient of said insolubilization agent to form insolubilized polymer and to produce a suspension containing stable agglomerates of filler particles, said particles being held together by said insolubilized polymer to form said agglomerates;

(c) intimately blending a filler amount of said suspension with a papermaking furnish to form a blend having an acid pH; and (d) forming a paper form said blend and recovering said paper.

26. The method of claim 25 wherein said at least one polymer is an alkali solubilized latex and casein and said agent is papermakers' alum.

27. A method of making paper using a calcium carbonate filler, which method comprises:

(a) forming an aqueous dispersion containing at least 30%, by weight, of said calcium carbonate filler, wherein the interparticulate water of said dispersion has dispersed therein at least one hydrophilic organic polymer selected from the group consisting of starch, alginates casein and alkali-solubilized latices, said at least one polymer being capable of being rendered water-insoluble by a chemical insolubilization agent;

(b) forming a suspension by adding a chemical insolubilization agent to said dispersion in a first amount which is insufficient to insolubilize all of said at least one polymer;

(c) intimately blending said suspension with a papermaking furnish having an acid pH containing a second amount of said agent sufficient to ensure, together with said first amount thereof, the formation of insolubilized polymer and to produce stable agglomerates of filler particles, said particles being held together by said insolubilized polymer to form said agglomerates;

(d) forming a paper from the papermaking furnish containing said agglomerates; and (e) recovering said paper.

28. The method of claim 27 wherein said at least one polymer is an alkali solubilized latex and casein and said agent is papermakers' alum.

29. The method of claim 1 wherein a surface active agent which is a deflocculant for said filler is also included in the dispersion of part (a).

* * * * *